United States Patent [19]

Ogden

[11] Patent Number: 5,047,605
[45] Date of Patent: Sep. 10, 1991

[54] INDUCTION WELDING APPARATUS AND METHOD

[75] Inventor: John E. Ogden, Libertyville, Ill.

[73] Assignee: Abbott Laboratories, Abbott Park, Ill.

[21] Appl. No.: 350,063

[22] Filed: May 10, 1989

[51] Int. Cl.$^5$ .............................................. H05B 6/06
[52] U.S. Cl. ........................ 219/10.41; 219/10.491;
219/10.53; 219/10.73; 219/10.77; 156/273.7;
156/380.6; 264/25
[58] Field of Search ............. 219/10.77, 10.53, 10.491,
219/10.75, 10.73, 9.5, 10.41, 10.79, 494, 516;
156/379.6, 379.7, 380.2, 380.6, 380.8, 272.2,
272.4, 273.7, 273.9, 274.2; 264/25, 26, 27;
425/174.8 R, 174.8 E

[56] References Cited

U.S. PATENT DOCUMENTS

| | | | |
|---|---|---|---|
| 3,740,859 | 6/1973 | Patton et al. | 219/10.77 X |
| 3,754,109 | 8/1973 | Moulin et al. | 219/9.5 |
| 3,764,767 | 10/1973 | Randolph | 219/10.79 X |
| 4,152,566 | 5/1979 | Mägerle | 219/10.53 |
| 4,246,461 | 1/1981 | Jeppson | 219/10.53 |
| 4,327,265 | 4/1982 | Edinger et al. | 219/10.77 X |
| 4,425,489 | 1/1984 | Pav et al. | 219/10.77 X |
| 4,438,310 | 3/1984 | Cachat | 219/10.491 X |
| 4,617,441 | 10/1986 | Koide et al. | 219/10.77 |

Primary Examiner—Philip H. Leung
Attorney, Agent, or Firm—Clifford A. Dean; Robert E. Wexler

[57] ABSTRACT

An apparatus and method for welding or thermally bonding parts of thermoplastic material by subjecting a die to high frequency electromagnetic radiation to effect heating thereof and heating of thermoplastic parts in contact with the heated die. The die is continuously cooled to permit rapid cooling thereof and of the parts in contact therewith upon deenergization of the source to reduce cycle time and facilitate automated production techniques using a single source and multiple die stations successively exposed to the source for heating and being rapidly cooled thereafter due to the continuous cooling thereof.

12 Claims, 2 Drawing Sheets

INDUCTION WELDING APPARATUS AND METHOD

FIELD OF THE INVENTION

The present invention relates to rapid, localized heating and cooling of materials, such as thermoplastic materials, and, more particularly, to the welding of such thermoplastic materials.

BACKGROUND OF THE INVENTION

There are a variety of methods and apparatus which may be used to heat a number of thermoplastic materials for welding and other thermal bonding operations. A number of such methods and apparatus are discussed in various editions of *Modern Plastics Encyclopedia,* McGraw Hill, New York, N.Y.

These thermal bonding and welding techniques have various limitations. Some require a high degree of operator skill and experience (e.g., hot gas welding). Some are limited to certain materials or shapes (e.g., friction welding, spin welding, and R.F. dielectric heating). Others require additions to the plastic (e.g., the addition of metal particles to permit induction heating of the plastic).

In contact heating or welding, the thermoplastic parts to be welded are normally pressed against a heated die or tool, usually under some pressure. After the parts are heated, the die or tool is removed and the heated parts are pressed together to form the bond or weld. Alternatively, a die heated directly, e.g., by resistance heating, might be configured to clamp the parts together. In any case, the heated tool is removed from the thermoplastic parts when sufficient heating has been achieved. When such hot dies or tools are removed from what are often molten thermoplastic parts, the parts and/or the weld itself may be disturbed, and this may tend to weaken the weld and cause a deterioration in appearance or strength.

Thus, in contact heating, the thermoplastic parts to be adhered, welded, or sealed are initially pushed under pressure against a heated tool until the desired consistency is achieved. The parts and the heated tool are then separated, the tool removed, and the heated parts pressed together to effectuate the desired bonding. Such techniques require precise timing and temperature control and, typically, also produce a significant weld bead which may be undesirable in finished products.

The quality of a bond or weld of thermoplastic material is related to proper heating and cooling of the parts being mated, among other factors. If the weld site is underheated, inferior welds may be produced, and/or the weld cycle lengthened unduly. Conversely, if the die is too hot, the thermoplastic parts or materials to be welded can be overheated, which can also produce inferior bonds or welds. Similarly, a poor quality weld can result from improper cooling of the welded parts. This can occur, for example, if the weld is disturbed, such as by removing dies or tools from the welded or bonded parts prematurely before the thermoplastic material has had an opportunity to cool and set.

Equipment for achieving thermoplastic welding, such as heaters and associated circuitry, is known but is often expensive. Costs easily escalate if it is necessary to provide multiple installations of equipment, such as would be used for many automated techniques. Furthermore, in automated production, it is often necessary to be able to adjust process parameters for different parts and for different conditions, which may be difficult and time-consuming.

It would be desirable, therefore, to provide a method and apparatus for welding thermoplastic parts, which could result in improved quality and uniformity of the welded parts, which would be compatible with improved production capabilities, which would be readily adaptable to automated production, and which could be achieved without markedly increasing operating costs and capital investment.

SUMMARY OF THE INVENTION

In accordance with the present invention, there is provided an apparatus and method for welding or thermally bonding parts of thermoplastic material by remotely heating a die in thermal contact with the parts to be welded. The apparatus and method of the present invention contemplates remote heating of the die or tool, as distinguished from direct heating thereof, and as distinguished from remote heating of the thermoplastic parts themselves.

Thus, in accordance with the present invention, there is provided a tool or die adapted to contact thermoplastic parts to be thermally bonded or welded. Such tools or dies are comprised of a material, such as, for example, stainless steel, that can be heated in response to high frequency electromagnetic radiation, such as radio frequency (RF) radiation. The utilization of such remote, die heating techniques produces a number of benefits. Dies can be configured to physically conform to the parts being welded, without being limited by connections to heaters and other circuitry. A variety of dies of different shapes can be heated and the temperature can be controlled and precisely maintained for desired time periods as appropriate.

The apparatus and method incorporating the present invention further contemplates the continuous cooling of the die to improve welding cycle time, and to minimize the liklihood of premature separation of the dies from the thermoplastic parts before they have properly cooled.

The method and apparatus of the present invention is particularly adaptable to production techniques using multiple welding stations. This decreases overall cycle time and allows parts being welded to be placed in the die, and allows the dies to be properly positioned relative thereto prior to heating and welding. After heating, the welded part and die in which it is retained can be moved away from the heating zone and allowed to properly cool before the die is separated therefrom.

Since a single energy source can be used to heat a plurality of dies and to successively weld a plurality of parts in contact therewith, the decrease in cycle time and improvements in weld quality can be achieved without the expense of providing multiple heating sources.

Furthermore, the use of remote heating, such as high frequency induction heating of the die tool, provides for rapid heating of the die and tool when exposed to the remote heating source, and also permits the use of a cooling source, or heat sink, in constant contact with the die or tool. This achieves rapid cooling of the die and the parts in contact therewith upon deenergization of the remote heating source, or upon movement of the die and parts being welded away from the source.

Such a heat sink may take the form of a large thermal mass of high thermal conductivity, which may be cooled, such as by circulating a chilled liquid therethrough. Even though the die or tools are subjected to such continuous cooling, the temperature of the die can be raised rapidly by remote or inductive heating. Furthermore, because of continuous cooling, the die or tool can be cooled rapidly after exposure to the electromagnetic radiation is terminated. Such rapid heating and cooling can produce high quality welds, and is particularly adapted to precise process control necessary for such high quality welds.

By utilizing an energy source of sufficient power, the effect of the heat sink can be overcome for short periods of time sufficient to rapidly heat the dies and achieve the desired thermal bonding or welding of the thermoplastic parts. When the source is deenergized, or the dies and parts moved away therefrom, the cooling of the dies and the welded parts in contact therewith begins immediately.

Such prompt, immediate cooling allows the die or tool to be separated from the welded thermoplastic parts more rapidly without adversely affecting the quality or appearance of the weld.

Furthermore, in accordance with the present invention, the temperature of the thermal parts being heated may be controlled by sensing the temperature of the die, or by other precise control techniques. For example, a temperature sensor in contact with the die can be utilized to provide a control signal indicative of the temperature of the die and, therefore, of the thermoplastic parts being heated. Such techniques permit the precise control of the temperature of the die and the thermoplastic parts being heated.

By decreasing the cycle time and increasing the rate at which a part can be heated and cooled, the quality of thermal welds can be maintained by avoiding the separation of the dies or tools from the welded parts before they are sufficiently cooled. The use of a single energy source with a plurity of tools capable of being moved into and out of the heating region allows for heating of successive parts while simultaneously permitting the cooling of the parts that have been welded and the preparation of the parts to be welded. Since the tools are not being subjected to heat other than from the remote source at a particular heating location, the manipulation of the tools and the rapid cooling at other locations is facilitated.

More specifically, in accordance with the apparatus and method of the present invention, a source of radio frequency energy is connected through an appropriate coil to effect the desired radiation and heating of the die and the resultant welding of a thermoplastic part in contact therewith. The dies or tools are made of materials, such as stainless steel, that are inductively heated in response to such high frequency radiation. In order to achieve the welding, the dies or tools are maintained in thermal contact with the parts to be welded when exposed to the radiation to effect the inductive heating of, and the resultant welding of, the thermoplastic parts.

Utilizing such remote heating, the die or tool can be maintained in continuous contact with a heat sink, such as a water cooled aluminum frame. While the induction heating of the die raises its temperature rapidly despite any heat loss to the heat sink, when inductive heating is terminated, the die is cooled rapidly.

Energy for welding the thermoplastic parts is applied to the tools rapidly, after which the die and thermoplastic parts are cooled quickly to allow for expedited separation of the parts from the die without disturbing the weld site.

The temperature at the interface between the die or tool and the parts being welded may be controlled by a feedback loop that includes a sensor for sensing the temperature of the die or the parts themselves, and utilizes the sensed temperature to control the intensity and duration of the die heating, so that excessive heating of the parts can be avoided. As a result, precise control of the amount, rate, and duration of the thermal energy applied to the die and, thereby, to the thermoplastic parts in contact therewith can be controlled.

Since a single source of high frequency energy can be utilized with a plurality of tools or dies, the shape of the dies can be conveniently selected to match the parts being bonded. A number of dies suitable for diverse parts can be provided. An array of such dies and associated parts may be moved in sequence to an induction heating or welding station, and a single RF generator, which is capable of heating a mixture of diverse dies and parts to be welded, can be used.

Numerous other advantages and features of the present invention will become readily apparent from the following detailed description of the invention and the embodiments thereof, from the claims, and from the accompanying drawings in which the details of the invention are fully and completely disclosed as a part of this specification.

DESCRIPTION OF SPECIFIC EMBODIMENTS

Figure 1:
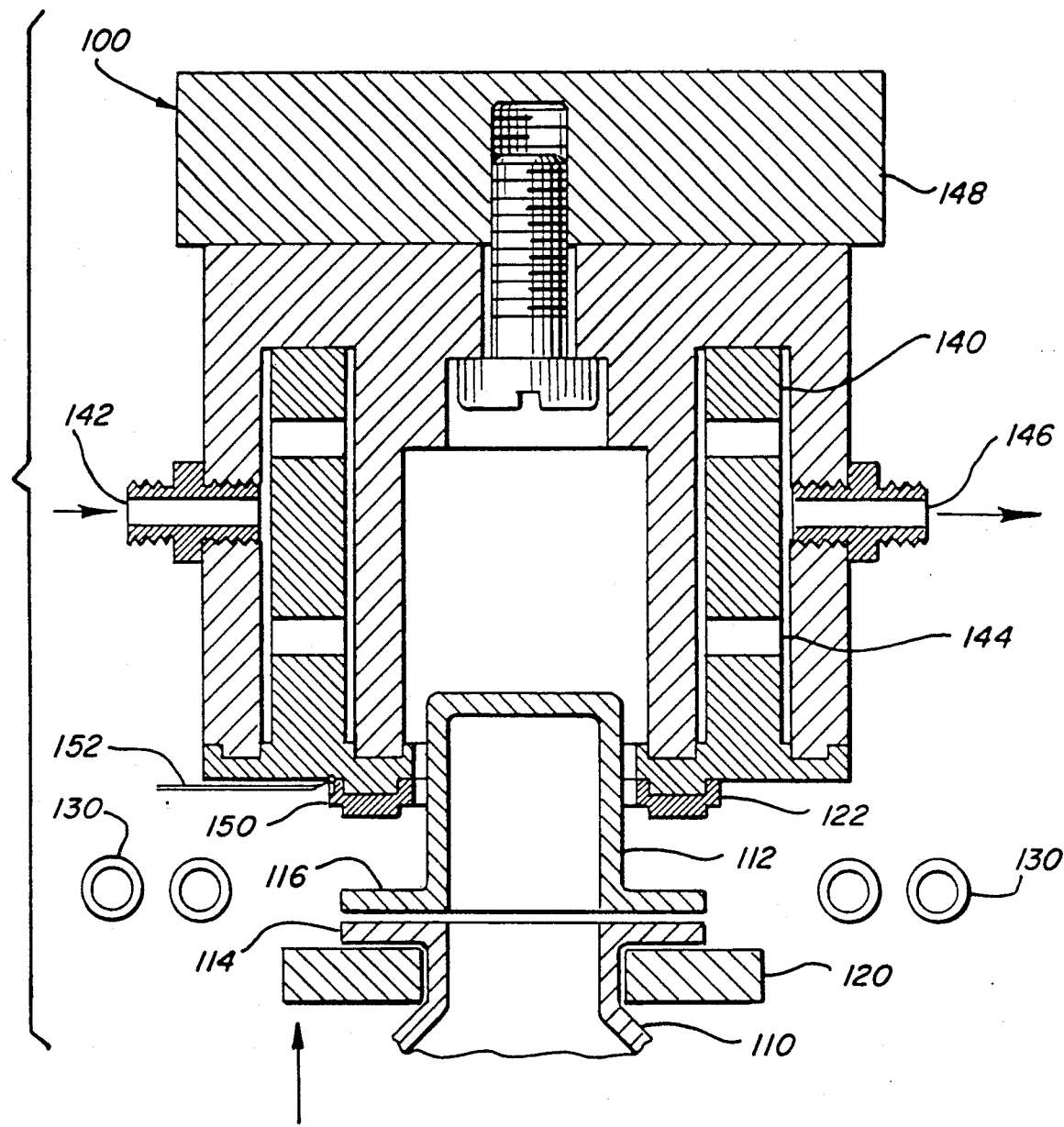
FIG. 1 is a cross-sectional view of an induction welding apparatus in accordance with the present invention in position to clamp thermoplastic parts for welding or thermal bonding.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

One embodiment of an induction welding station 100 in accordance with the present invention is shown in FIG. 1. The station 100 operates to weld together thermoplastic parts 110, 112. These parts are illustrated as a container 110 (partially shown) having a flange 114 and a cap 112 having a flange 116. As shown, the flanges 114, 116 of the container 110 and cap 112, respectively, are to be welded together. The parts 110, 112 are illustrated just prior to being clamped together under pressure between a lower die 120 and an upper die 122.

At least one of the dies 120, 122 is made of a material that is heated when exposed to electromagnetic radiation, in response to such radiation. In FIG. 1, upper die 122 is composed of such a meterial, e.g., stainless steel. The moveable lower die 120 may be the same material as upper die 122, or may be a material, such as a hardened plastic, which is substantially unaffected by electromagnetic radiation. Both dies have surfaces that facilitate the clean release of clamped objects.

An induction coil 130 is shown as being toroidal in shape. It is configured to produce an electromagnetic field sufficient to inductively heat the die 122. If appropriate, the induction coil 130 may be liquid cooled by chilled liquid, normally water, flowing within internal channels formed therein. Such cooling liquid is substantially unaffected by the electromagnetic field.

In practice a single induction welder, which constitutes a major portion of the cost of a welding system, may be used with a plurality of dies, as appropriate for the particular welding task to be accomplished. Although two dies are shown for welding together the container 110 and cap 112, other configurations may be used for different parts.

Upper die 122 is mounted in thermal contact with a substantial thermal mass in the form of frame 140. The frame 140 is typically made of a thermally conductive material, such as aluminum. It may be cooled, by passing a cooling liquid, such as water into an inlet orifice 142, through circulation holes 144 in the frame 140, and out of an outlet orifice 146. The presence of the cooling liquid requires that the joints between a surrounding case 148 and the frame 140 should be water tight.

The large thermal mass and high thermal conductivity of frame 140, provides excellent thermal communication with the relatively smaller thermal mass of die 122, and maintains the die 122 at the ambient temperature of frame 140, except for those times when the die 122 is inductively heated. The induction heating of die 122 by an rf electromagnetic field generated by induction coil 130 overcomes the heat loss to the heat sink or frame 140. The die 122 undergoes a rapid cooling to the temperature of frame 140 immediately after the r.f. source represented by coil 130 is deenergized.

It is often desirable to control the temperature of die 122. If the temperature of die 122 is allowed to rise too high, the parts 110, 112 can be damaged.

Figure 2:
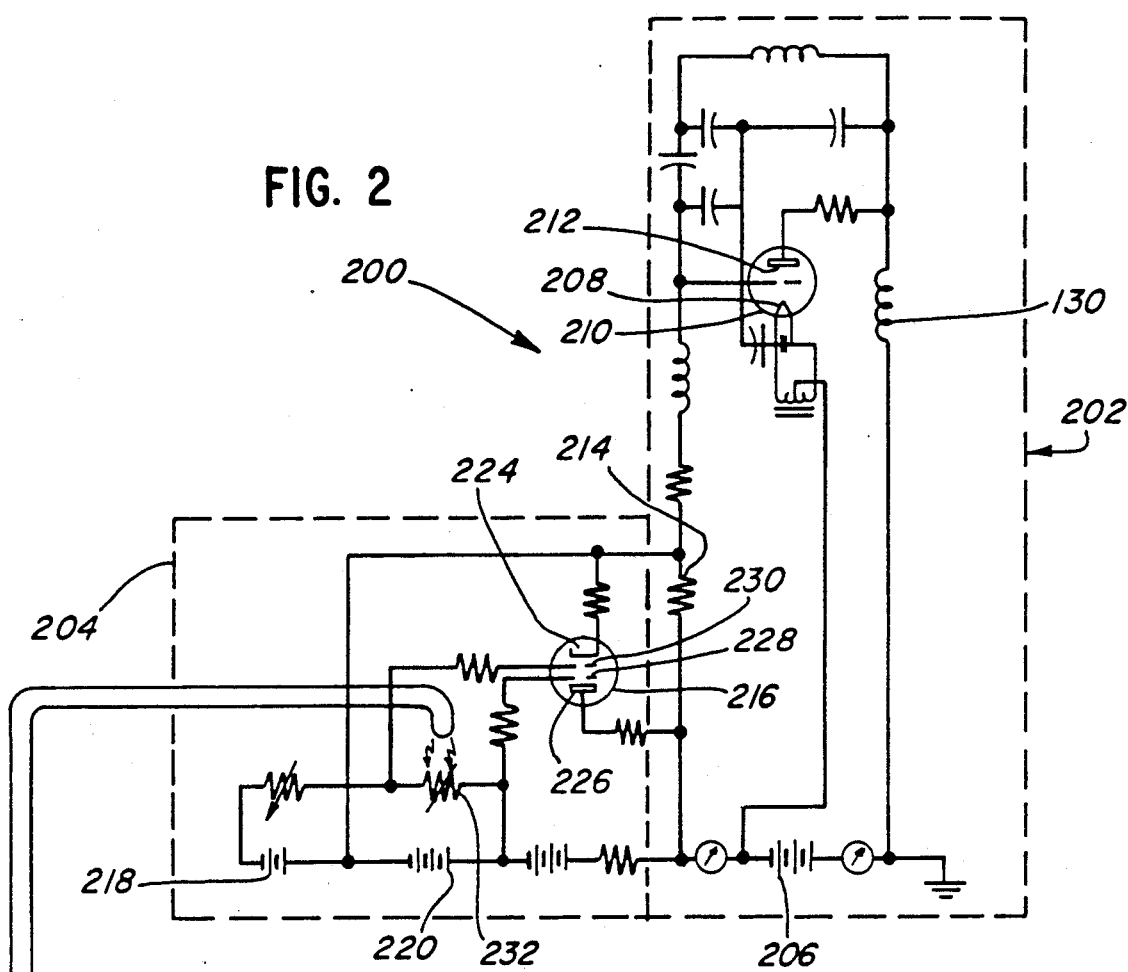
FIG. 2 is a schematic diagram of a radio frequency (rf) generator, including a temperature control feedback circuit, for control of the generator.

In accordance with the present invention, a feedback circuit regulates the intensity of the rf electromagnetic field produced by coil 130 in accordance with a sensed temperature of die 122. One type of temperature sensor usable in this feedback control loop is a thermocouple. Such a sensor 150 senses the temperature of die 122. The sensed temperature is communicated as an electrical signal via leads 152 to a control circuit such as shown in FIG. 2.

Temperature sensing may alternatively be achieved by remote sensing with infrared light. The light that is sensed may eminate from a desired surface of die 122, or directly from the parts 110, 112, e.g., at or near weld site locations.

As still another alterative, a feedback control loop for controlling the heating of the die 122 may be based on deformation of the parts 110, 112 under pressure due to its thermoplastic flow. Such a deformation may be sensed, for example, by the movement of moveable die 120 during the welding process. Movement that occurs from the deformation of parts 110, 112 during heating and welding may be sensed by suitable mechanical sensors, such as, piezoelectric sensors. Such sensors may be located, for example, at the interface between the die 122 and the frame 140, and/or other spatially fixed elements.

Thus, sensor 150 shown in FIG. 1 may be a piezoelectric pressure sensor. When the parts 110, 112 clamped under pressure between dies 120, 122 begin to flow thermoplastically the pressure sensed by a piezoelectric sensor drop. The signal produce in response to this sensed pressure reduction may be used to modify, e.g., reduce, or terminate, the inductive heating.

A schematic diagram of a temperature feedback control circuit in accordance with the present invention for the control of induction welding is shown in FIG. 2. A radio frequency (rf) generator 200 consists essentially of rf oscillator 202 and grid clamp circuit 204. Within the rf oscillator 202, the positive terminal of a high voltage power supply 206 is grounded. Although the negative terminal of the high voltage power supply 206, which terminal is connected to the cathode 208 of the oscillator triode vacuum tube 210, may be grounded, the practice of grounding the positive terminal allows the coil 130, which is a component of the welder most likely to be inadvertently touched by an equipment operator, to be maintained near ground potential. Accordingly, the grounded positive terminal of the high voltage power supply 206 is connected to the anode 212 of triode vacuum tube 210 while the negative terminal of power supply 206 is connected through a filter circuit to the cathode 208 of vacuum tube 210.

The grid clamp circuit 204 operates to determine the duty cycle of rf oscillator 202. The grid clamp circuit 204 produces a grid bias voltage across load resistor 214. A larger grid bias voltage across load resistor 214 produces a shorter "on" duty cycle of vacuum tube 210, a lesser current flow in coil 130 and a less intense rf field. Conversely, a lower grid bias voltage developed across load resistor 214 produces a longer "on" duration duty cycle in tube 210, a greater current flow in coil 130, and a more intense rf field.

The voltage across load resistor 214 is determined by the conduction of dual grid vacuum tube 216. It should be noted that the power supplies 218, 220, 222 of the grid clamp circuit 204 are referenced to power supply 206 of rf oscillator 202. Thus, the entire grid clamp circuit is approximately −4,000 vdc. The sum of the voltages of power supplies 220 and 222, or 350 vdc, appears between cathode 224 and anode 226 across vacuum tube 216. Screen grids 228, 230 are respectively referenced by power supply 218 to be at approximately +210 vdc and −90 vdc, respectively, relative to cathode 224 that is at −0 vdc. The conduction of the vacuum tube 216 is dependent upon the voltage between screen grid 228 and cathode 224 and the voltage between cathode 224 and screen grid 230. Typical screen-cathode voltage is about 220 volts, while the control grid voltage varies between −25 at the cut off of plate current to −10 at full plate current. The control grid-cathode voltage is primarily controlled by a photoresistor 232 and the amount of light falling thereon.

Figure 3:
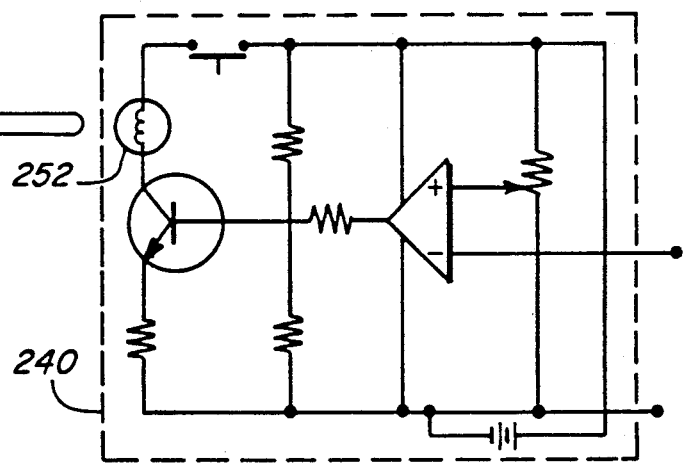
FIG. 3 is a schematic diagram of a first embodiment of a temperature sensing circuit for use with the temperature control feedback circuit shown in FIG. 2.
Figure 3:
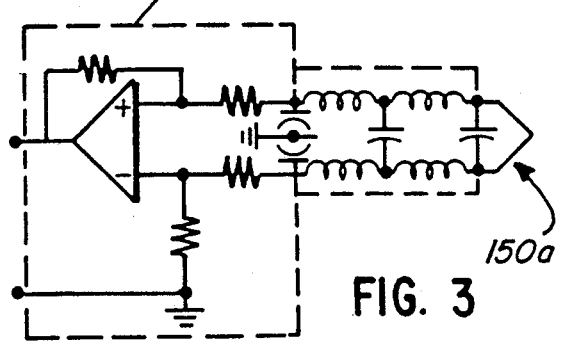
Figure 4:
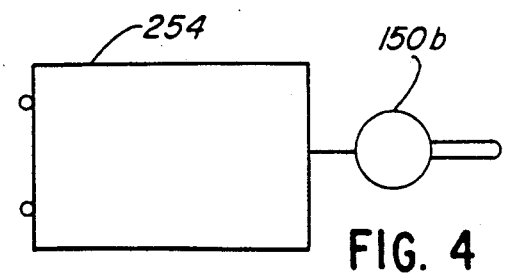
FIG. 4 is a schematic diagram of a grid block keying circuit for use with the temperature control feedback circuit of FIG. 2.

In accordance with the present invention, a selective one of the amplified and filtered signals from a thermocouple 150a as shown in FIG. 3, or an infrared temperature sensor 150b as shown in FIG. 4, is fed back through a voltage/photo converter circuit 240 to be communicated as a light signal via lightpipe 245 to control the variable resistance of photoresistor 232.

The thermocouple temperature sensor 150a shown in FIG. 3 may be a J type having a millivolt range output. The output signal from the thermocouple temperature sensor 150a is filtered and applied as a differential signal input to differential amplifier circuitry 250. The amplified output signal is received at voltage/photo converter 240 and is further amplified for variably energizing light source 252. The variable light from light source 252 is transmitted as a control signal via lightpipe 245.

An alternative temperature sensor circuit shown in FIG. 2 makes use of an integrated infrared (i−r) temperature sensing system. The system includes i−r temperature sensor 150b and its i−r controller 254, such as are available from Vansetti, Inc. This alternative temperature sensor detects the infrared radiation emissions of the object for which temperature is being monitored. It has a signal output that is proportional to temperature. An alternative amplification (not shown) of this signal within the voltage/photo converter 240 serves to variably energize light 252 and cause the transmission of a control signal via light pipe 245. Adjustment of the temperature set variable potentiometer 256 within the voltage/photo converter 240 provides for different levels of signal feedback, and corresponding temperature control.

The net affect of the voltage/photo converter 240, is to produce a optical signal in lightpipe 245 the brightness of which is a function of the temperature of the sensed object, typically the die 122. The sensing of the temperature of the die 122 by thermocouple requires that the leads of the thermocouple should be within a strong magnetic field. Although this does not present any great problem, it is often preferred that the sensing of the die's temperature should be by means of the infrared temperature sensor. The precise temperature at which the die will be maintained when inductively heated is determined by the voltage/photo converter 240 and a gridblock keyer circuit 260 to which it connects. The die 122 is typically maintained at an appropriate temperature as best suits the particular task of induction heating. Normally for welding this temperature is in the range of 400° F.

In accordance with the present invention, certain variations in the present invention will suggest themselves to those skilled in the art. The shape of the die, where it is positioned, and those particular elements of the welding process relative to which the die is moveable are all subject to considerable variation. For example, both dies, or the die 120 instead of the die 122, could have been heated by the radiant electromagnetic field. The remote heating need not have been electromagnetic, but could have been by radiant light energy, such as by use of a laser.

The feedback control circuit for control of the inductive heating, particularly in the process of welding depends upon the sensing of temperature. As previously mentioned, the feedback control could alternatively be based on the sensing of the physical displacement of a part or portion thereof resulting from the application of heat. It is also possible that feedback control circuits could, in certain situations, be appropriately based on the sensing of light transmission through the part, electrical conductivity of the part, and/or other parameters as appropriate for the monitoring of selected conditions within the part.

From the foregoing, it will be observed that numerous variations and modifications may be effected without departing from the true spirit and scope of the novel concept of the present invention. It will be understood that no limitations with respect to the specific embodiments illustrated herein is intended or should be inferred. It is, of course, intended to cover by the appended claims all such modifications as fall within the scope of the claims.

What is claimed is:

1. A method of heating a part of thermoplastic material comprising
the steps of:
positioning a die made of a material that is heated in response to high frequency electromagnetic radiation in thermal contact with the part;
exposing said die to high frequency electromagnetic radiation to effect heating of the die and of the part in said thermal contact therewith;
continuously cooling the heated die while it is in thermal contact with the heated part to cool both the heated die and the heated part in thermal contact therewith; and
simultaneously exposing said die to sufficient electromagnetic radiation to effect said heating of said die and the part.

2. The method according to claim 1 including the step of:
effecting said continuous cooling by maintaining a cool thermal mass of high thermal conductivity in constant thermal contact with said die.

3. The method according to claim 2 including the step of:
continuously cooling said thermal mass with a cooling liquid in contact therewith.

4. A method of heating a thermoplastic part including the steps of:
positioning the part in thermal contact with a body that is heated in response to electromagnetic radiation; inductively heating the body with electromagnetic radiation to effect heating of the part by the inductively heated body in thermal contact therewith;
sensing the temperature of the body; and
regulating the radiation in accordance with the sensed temperature of controlling the temperature of said body and thereby of the part.

5. The method according to claim 4 including the steps of:
terminating the electromagnetic radiation after a predetermined temperature of said body is sensed to end the heating thereof.

6. A method of heating a thermoplastic part including the steps of: positioning the part in thermal contact with a body that is heated in response to electromagnetic radiation; inductively heating the body with electromagnetic radiation to effect heating of the part by the inductively heated body in thermal contact therewith;
sensing a plastic deformation of the part during the heating thereof; and
regulating the electromagnetic radiation to control the inductive heating of said body in accordance with the sensing of the plastic deformation of the part.

7. An apparatus for heating a part of thermoplastic material comprising:
a die comprised of a material that is heated in response to high frequency electromagnetic radiation, said die being in thermal contact with the part;
a source of high frequency electromagnetic radiation;
means for periodically electromagnetically coupling said high frequency electromagnetic radiation to said die with sufficient intensity to effect heating of said die and thereby of the part in thermal contact therewith; and
a heat sink in thermal contact with said heated die for cooling said die and the heated part in contact therewith when said source is deenergized.

8. The apparatus according to claim 7 wherein:
said heat sink is in constant thermal communication with said die for continuously cooling said die; and
said electromagnetic radiation is of sufficient magnitude and duration to heat said die and the part while said heat sink is in thermal contact with said die.

9. The apparatus according to claim 8 wherein said heat sink comprises a thermal mass that is both larger than the thermal mass of the die and of high thermal conductivity.

10. The apparatus according to claim 7 including means for circulating a cooled liquid within the body of the mass of the heat sink for effecting cooling thereof and of said die in contact therewith.

11. An induction welder for welding together parts of thermoplastic material comprising:
- a metallic die element heated in response to high frequency electromagnetic radiation and sized and adapted for making thermal contact with parts to be welded proximate to a desired weld site;
- a source of high frequency electromagnetic radiation for effecting heating of said die and the parts in thermal contact therewith to effect welding together of the parts;
- a feedback control circuit for sensing the temperature of the die element and for controlling the source of electromagnetic radiation to control the temperature sensed;
- said feedback control circuit including a temperature sensor for sensing the temperature of the die element, and circuit means connected to the temperature sensor for producing an electrical control signal to control said source;
- said temperature sensor producing an electrical signal; and said circuit further comprising:

amplifier means for receiving and amplifying the electrical signal from the temperature sensor;
conversion means responsive to the amplified electrical signal from said amplifier means for converting said electrical signal to an optical signal; and
control means responsive to said optical signal for producing an electrical signal for controlling said source.

12. An induction welder for welding together parts of thermoplastic material comprising:
- a metallic die element heated in response to high frequency electromagnetic radiation and sized and adapted for making thermal contact with parts to be welded proximate to a desired weld site;
- a source of high frequency electromagnetic radiation for effecting heating of said die and the parts in thermal contact therewith to effect welding together of the parts;
- a feedback control circuit for sensing the temperature of the die element and for controlling the source of electromagnetic radiation to control the temperature sensed:
wherein said source comprises:
- a radio frequency oscillator for producing a high frequency electromagnetic signal, a grid clamp circuit connected to the radio frequency oscillator for controlling the strength of the high frequency electromagnetic signal produced by the radio frequency oscillator, and a coil responsive to the high frequency electromagnetic signal from the radio frequency oscillator for radiating the signal as high frequency electromagnetic radiation; and
said feedback control circuit comprises a temperature sensor for sensing the temperature of the die element, a controller responsive to the sensed temperature from the temperature sensor for controlling the grid clamp circuit and the radio frequency oscillator to maintain a predetermined temperature of the die element.

* * * * *